United States Patent
Kristof et al.

(10) Patent No.: US 10,411,636 B2
(45) Date of Patent: Sep. 10, 2019

(54) CONTROL SYSTEM FOR A THREE-PHASE AC MOTOR

(71) Applicant: Dr. Ing. h.c. F. Porsche Aktiengesellschaft, Stuttgart (DE)

(72) Inventors: Thomas Kristof, Karlsruhe (DE); Dirk Herke, Kirchheim unter Teck (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/033,403

(22) Filed: Jul. 12, 2018

(65) Prior Publication Data

US 2019/0052215 A1    Feb. 14, 2019

(30) Foreign Application Priority Data

Aug. 11, 2017    (DE) .......................... 10 2017 118 342

(51) Int. Cl.
| | |
|---|---|
| *H02P 27/08* | (2006.01) |
| *H02P 3/20* | (2006.01) |
| *H02K 17/12* | (2006.01) |
| *H02P 25/22* | (2006.01) |

(52) U.S. Cl.
CPC ............. *H02P 27/08* (2013.01); *H02K 17/12* (2013.01); *H02P 3/20* (2013.01); *H02P 25/22* (2013.01)

(58) Field of Classification Search
CPC .......... H02P 23/26; H02P 29/40; H02P 6/005; H02P 23/30; H02P 25/22; H02P 25/18; H02M 1/10; H02M 2001/0022
See application file for complete search history.

(56) References Cited

U.S. PATENT DOCUMENTS

| | | | |
|---|---|---|---|
| 7,088,066 B2 * | 8/2006 | Haller ................. | H02M 1/10 173/5 |
| 7,224,079 B2 * | 5/2007 | Kanazawa ........... | H02J 7/1492 290/40 B |

(Continued)

FOREIGN PATENT DOCUMENTS

| | | |
|---|---|---|
| DE | 3721477 A1 | 1/1989 |
| DE | 10215686 A1 | 10/2003 |

(Continued)

OTHER PUBLICATIONS

German Search Report for German Application No. 10 2017 118 342.6, dated May 28, 2018, with partial English translation—7 pages.

*Primary Examiner* — Rina I Duda
(74) *Attorney, Agent, or Firm* — RatnerPrestia

(57) ABSTRACT

A method for controlling a three-phase AC motor, wherein the three-phase AC motor has a rotatably mounted rotor and a stator including a first group of coils and a second group of coils. Each of the coils generates an oscillating magnetic field upon actuation using an alternating current. The phases of the alternating currents are selected such that the superposition of the magnetic fields of the first group of coils generates a magnetic rotating field that rotates with a direction of rotation and the superposition of the magnetic fields of the second group of coils generates a magnetic rotating field that rotates counter to the direction of rotation. A system composed of a three-phase AC motor and an inverter for carrying out the control method is also described.

6 Claims, 1 Drawing Sheet

(56) References Cited

U.S. PATENT DOCUMENTS

| | | | |
|---|---|---|---|
| 7,439,697 B2 * | 10/2008 | Miyazaki | B60L 15/025 318/400.41 |
| 7,697,826 B2 * | 4/2010 | Reutlinger | B25B 21/008 388/800 |
| 8,030,816 B2 * | 10/2011 | Atarashi | H02K 1/2793 310/156.35 |
| 8,378,600 B2 * | 2/2013 | Katou | B25F 5/02 318/400.01 |
| 9,543,880 B2 | 1/2017 | Nakamura et al. | |
| 2007/0120520 A1 | 5/2007 | Miyazaki et al. | |
| 2009/0033251 A1 | 2/2009 | Perisic et al. | |
| 2014/0009101 A1 * | 1/2014 | Dietl | H02P 6/005 318/724 |
| 2016/0365821 A1 | 12/2016 | Hustedt | |

FOREIGN PATENT DOCUMENTS

| | | |
|---|---|---|
| DE | 102008004013 A1 | 7/2009 |
| DE | 102008004039 A1 | 7/2009 |
| DE | 102011013885 A1 | 9/2012 |
| DE | 102015212585 A1 | 1/2016 |
| WO | 2014132385 A1 | 9/2014 |
| WO | 2014207858 A1 | 12/2014 |

* cited by examiner

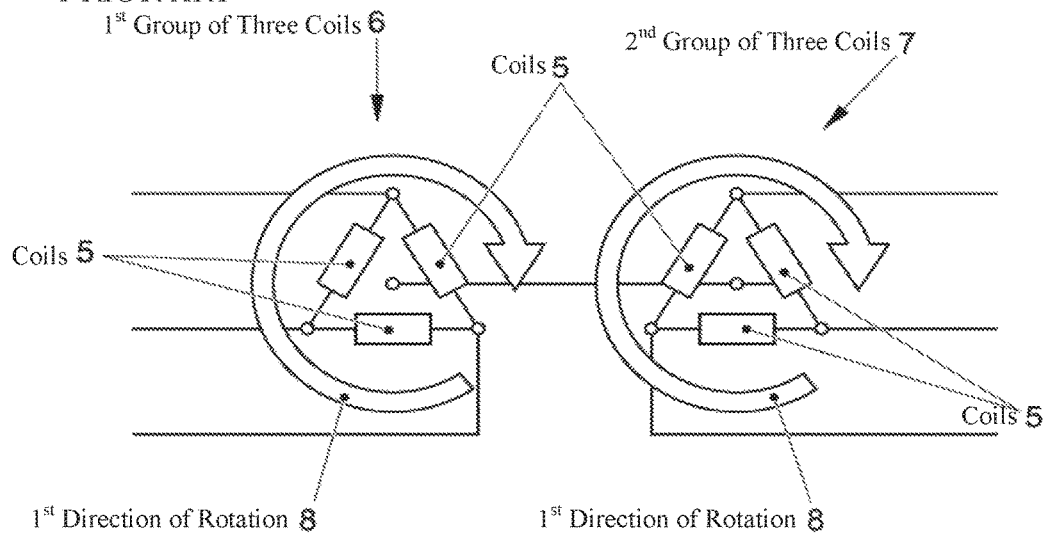
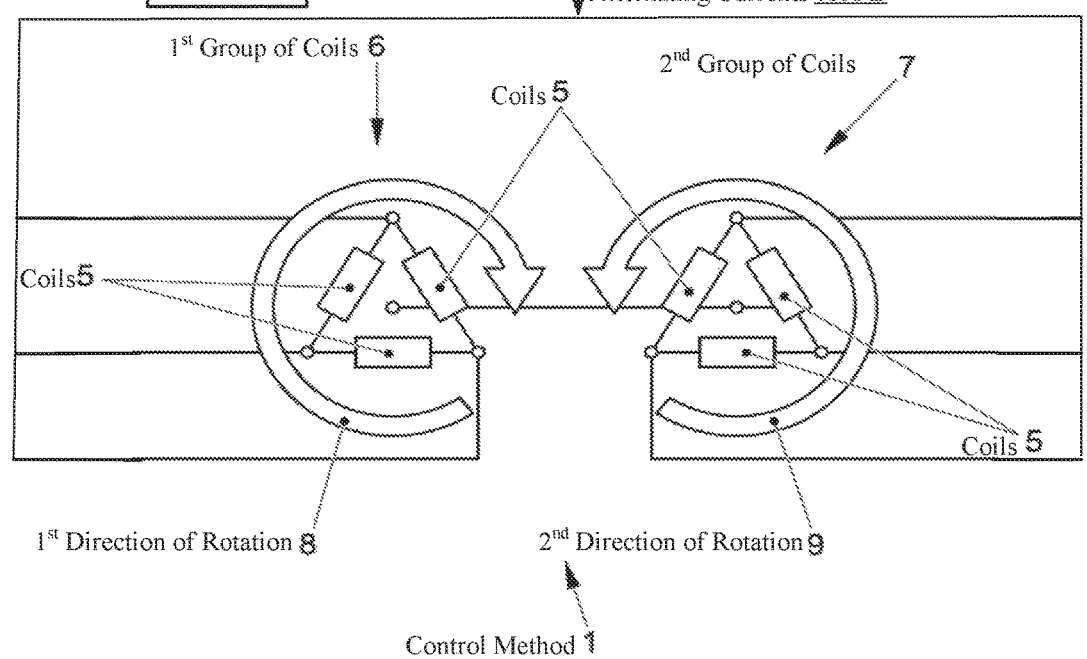

CONTROL SYSTEM FOR A THREE-PHASE AC MOTOR

CROSS-REFERENCE TO RELATED APPLICATION

This application claims priority to German Patent Application No. DE 10 2017 118 342.6, filed Aug. 11, 2017, which is incorporated by reference herein in its entirety.

FIELD OF THE INVENTION

The present invention relates to a method for controlling a three-phase AC motor, wherein the three-phase AC motor has a rotatably mounted rotor and a stator comprising a first group of coils and a second group of coils, wherein each of the co generates an oscillating magnetic field upon actuation using an alternating current.

BACKGROUND OF THE INVENTION

Three-phase AC motors are known from the prior art in various embodiments. What they all have in common is that, in said three-phase AC motors, coils are arranged in the stator, said coils being operated using phase-offset alternating currents such that an oscillating magnetic field is formed around each coil. The geometric arrangement of the coils and the associated phases are selected here in such a way that the magnetic fields of all the coils are superposed to form a rotating magnetic field that exerts a torque on the rotor.

A common design is in this case the three-phase AC motor having three phases, in which the coils are arranged on the stator in such a way that the magnetic fields generated by the coils are arranged at an angle of 120° with respect to one another and the associated phases are shifted by 120° with respect to one another. The individual oscillating fields are superposed here to form a rotating field, wherein the field amplitude remains constant and rotates at the frequency of the applied three-phase alternating current. Calculation methods that can be used to determine the resulting rotating field from a general geometric arrangement of coils and the associated phases are known to those skilled in the art from the literature (for example Rolf Fischer, "Elektrische Maschinen" [Electric Machines], Section 4.2).

In many cases, the primary voltage source provides a DC voltage, which first has to be converted to the necessary AC voltages by means of an inverter. Such a situation is present, in particular, in electric motors fed by a battery, as is the case in electric vehicles, for example. A common design of this conversion consists in that the desired AC voltage is generated by pulse-width modulation, wherein the shape of the voltage profile and the phase and frequency thereof can be set in a controlled manner in a broad range by controlling the modulator accordingly.

A further model is a three-phase AC motor having 6 phases. To this end, documents US Patent App. Pub. No. 2007120520, which is incorporated by reference herein, WO 2014132385, which is incorporated by reference herein, and WO 2014207858, which is incorporated by reference herein, disclose designs having two sets of three-phase windings and inverters for generating rotating fields. Document US 20090033251, which is incorporated by reference herein, discloses an electric motor, in which six phases are generated by means of an inverter in order to control the torque generated in the motor. Document US Patent App. Pub. No. 20160365821, which is incorporated by reference herein, addresses an electric motor having two sets of three-phase windings that can be operated in six phases.

These embodiments are designed to convert electrical energy to kinetic energy as efficiently as possible.

BRIEF DESCRIPTION OF THE DRAWING

Further details, features and advantages of the invention will emerge from the drawings and from the following description of preferred embodiments on the basis of the drawings. The drawings in this case illustrate purely exemplary embodiments of the invention, which do not restrict the concept of the invention.

FIG. 1 schematically illustrates a control system of a three-phase AC motor having six phases in accordance with one embodiment according to the prior art.

FIG. 2 schematically illustrates a control system of a three-phase AC motor having six phases in accordance with one embodiment of the present invention.

DETAILED DESCRIPTION OF THE INVENTION

FIG. 1 illustrates a control system 1 of a three-phase AC motor according to the prior art. The sketch depicts in this case only the manner in which the six coils 5 are actuated using the individual phases of the six-phase alternating current without the geometric arrangement of the coils 5 being apparent therefrom. In the depiction, the respective three coils 5 of the first group 6 and second group 7 are connected in series by means of a delta connection. In this case, the six coils 5 together form a spatial arrangement (not shown), in which the coils 5 of the first group 6 and of the second group 7 follow one another alternately and, during operation using alternating current, generate six oscillating magnetic fields each offset by 60°. In the case of in each case two magnetic fields offset by 60°, the time profile of the magnetic field oscillations is phase-shifted here by 60°. The magnetic fields of the first group 6 are superposed thereby to form an overall magnetic field, the direction of which rotates in the illustrated first direction of rotation 8, wherein the field strength remains constant over time. The magnetic fields of the second group 7 are superposed to form an overall magnetic field that likewise rotates in the first direction of rotation 8. As a result, the rotating fields of the two groups 6, 7 are superposed in such a way that, again, an overall rotating field rotating in the first direction of rotation 8 is formed. The overall rotating field induces a current in the windings of the rotor (not illustrated), the magnetic field of said current counteracting the outer overall rotating field. This creates a torque between the rotor and the coils 5 that makes the rotor rotate. Since the magnetic fields of all the coils 5 in this arrangement amplify the overall rotating field, a maximum torque is generated and, associated therewith, a maximum conversion of electrical power to movement.

FIG. 2 illustrates a control system 1 of a three-phase AC motor according to the present invention. As shown in FIG. 1, the sketch here also depicts the assigning of the phases to the coils 5 without the spatial arrangement of the coils 5 being apparent from the drawing. The six coils 5 generate a sequence of magnetic fields offset in each case by 60° with respect to one another. Of those six coils, the first group 6 comprises three coils 5 having associated magnetic fields, which are arranged offset by 120° with respect to one another and the time profiles of which are phase-shifted by 120° in a positive manner with respect to one another. The second group 7 comprises the remaining three coils 5, the magnetic fields of which are likewise arranged offset by 120° with respect to one another and the time profiles of which are phase-shifted by 120° in a negative manner with respect to one another. As a result, the magnetic fields of the first group 6 are superposed in such a way that a rotating field that rotates in the depicted first direction of rotation 8 is generated. In contrast, the magnetic fields of the second group 7 are superposed such that the resulting rotating field rotates in the depicted second direction of rotation 9. The rotating field rotating in the first direction of rotation 8 and the rotating field rotating in the second direction of rotation 9 are superposed to form an overall rotating field, which does not rotate but instead is oriented in a defined direction, wherein the field strength oscillates over time. These oscillations induce currents in the windings of the rotor, said currents not, however, making the rotor rotate as in the rotating field but instead merely converting the electrical power to ohmic heat. In other words, the rotating fields rotating in opposite directions exert two opposite torques on the rotor, which torques cancel each other out, such that the power consumed is converted to heat without the rotor being made to rotate.

Described herein is a control method 1 through which electrical power is fully or partly converted to heat in a targeted manner.

A method for controlling a three-phase alternating current (AC) motor is disclosed, wherein the three-phase AC motor has a rotatably mounted rotor and a stator comprising a first group of coils 6 and a second group of coils 7, wherein each of the coils 5 generates an oscillating magnetic field upon actuation using an alternating currents 13A-B, wherein the phases of the alternating currents 13A-B are selected such that the superposition of the magnetic fields of the first group of coils 6 generates a magnetic rotating field that rotates with a direction of rotation and the superposition of the magnetic fields of the second group of coils 7 generates a magnetic rotating field that rotates counter to the direction of rotation 8 in a second direction of rotation 9.

This method makes it possible to configure the actuation of the motor coils 5 such that the proportion of electrical energy converted to heat and the proportion driving the rotary movement of the motor can be set in a controlled manner. As a result, it is advantageously possible to generate heat without a separate heating mechanism being required. In a vehicle, the generated heat can then be fed to the heating/cooling system, for example.

In order to describe the spatial arrangement of the coils 5 and the temporal response of the alternating currents 13A-B associated with the coils 5 clearly, it is assumed in the following text that a running direction is stipulated for the arrangement of the coils such that the orientations of the magnetic fields generated by the coils form a defined sequence of angles in this running direction and the phases of the alternating currents 13A-B associated with the coils analogously form a defined sequence of phase angles. When the phase angles are shifted in a positive manner with respect to one another in the running direction, that is to say each phase temporally leads its predecessor, a rotating field that rotates counter to the running direction is created. In contrast, if the phase angles are shifted in a negative manner with respect to one another in the running direction, a rotating field that rotates in the running direction is created. The stipulation of said running direction is in this case arbitrary and serves only to provide a frame of reference for a clear description.

In accordance with a preferred embodiment of the present invention, the method for operating a six-phase motor known from the prior art is used, in which the six alternating currents 13A-B are each shifted by 60° with respect to one another and in each case operate six coils arranged at angular steps of 60° with respect to one another. In order to realize the actuation according to aspects of the invention, the six coils 5 are subdivided into two groups 6 and 7 such that the coils within each group 6 and 7 are each arranged in a manner rotated by 120° with respect to one another. For the control system according to aspects of the invention, it now suffices to leave the actuation of the first group 6 unchanged and to reverse the phase sequence of the second group 7. As a result, the second group 7 generates a rotating field that rotates in an opposing direction with respect to the rotating field of the first group 6. If the amplitudes of all the alternating currents 13A-B are equal, the two rotating fields exert opposing torques on the rotor, said two rotating fields mutually canceling each other out. The electrical power is therefore not converted to movement but instead converted to heat.

Further embodiments of the invention emerge through generalization of the described six-phase system. In this case, 2n coils are arranged at equal angular steps of 180°/n with respect to one another and are divided into two groups 6 and 7 of in each case n coils 5 such that the coils 5 of each group 6 and 7 are arranged at angular steps of 360°/n with respect to one another. The coils of the first group 6 are operated using alternating currents 13A that are phase-shifted in a positive manner with respect to one another, whereas the coils of the second group 7 are operated using alternating currents 13B that are phase-shifted in a negative manner with respect to one another. The operation of a six-phase motor described further above corresponds in this case to the special case of n=3.

Furthermore, embodiments of the invention in which a plurality of coils 5 belong to the same line run and are accordingly actuated using the same alternating current are also possible. This results in a geometric arrangement of n coils and m≤n associated phase angles. The n coils are again divided into two groups 6 and 7, which do not necessarily comprise the same number of coils. The possibilities of assigning the alternating currents 13A-B to the coils 5 such that the resulting magnetic fields of the two groups 6 and 7 rotate in the opposite direction can be described systematically only with difficulty but can be determined easily by those skilled in the art by means of the calculation methods described at the outset.

In accordance with a further embodiment of the invention, the two groups 6 and 7 are actuated using respective alternating currents 13A-B that within the first group 6 are phase-shifted in a positive manner with respect to one another and within the second group 7 are phase-shifted in a negative manner with respect to one another. In this case, the amplitudes of the alternating currents 13A-B are each identical within one group but differ between the two groups. As a result, two rotating fields rotating in the opposite direction are generated, wherein the strength of the first and second field is in each case constant over time and changes cyclically in direction, in this case, however, the first rotating field has a greater or lower field strength than the second rotating field. During the superposition, the torques of the two rotating fields do not mutually cancel each other out but instead generate a residual torque in the difference, while some of the electrical power is converted to heat. In the case of such superposition of the two rotating fields, a so-called elliptical rotating field is generally generated, which rotates at a constant rate and generates as a result the residual torque, the field amplitude of which, however, varies over time such that a pulsating profile of the residual torque results.

Further embodiments of the invention result from the generalizations in which a general number n of coils is operated using m≤n alternating currents 13A-B each having m amplitudes. In this case, too, the possibilities of assigning the currents and coils to one another such that the two groups 6 and 7 generate oppositely rotating magnetic fields cannot be illustrated succinctly, but can be determined by those skilled in the art by means of the calculation methods mentioned at the outset.

A further subject of the invention is a system composed of a three-phase AC motor and an inverter 12 for carrying out the control method 1 described in the claims. All the embodiments of the control method can be carried out using the system according to aspects of the invention, as a result of which the system also has the advantages of the respective embodiment mentioned at the corresponding location.

In accordance with a preferred embodiment of the system composed of a three-phase AC motor and an inverter 12 according to aspects of the invention, the inverter 12 is designed in such a way that it is fed from a DC voltage 11 applied from a primary voltage source 14 (e.g., battery) and generates therefrom a plurality of AC voltages 13A-B phase-offset with respect to one another by pulse-width modulation (PWM). Said AC voltages 13A-B are then applied in accordance with the invention to the coils 5 in such a way that the thus generated magnetic fields of a first direction of rotation 8 of the first group of coils 6 are superposed to form a rotating field that rotates in the opposite direction to the rotating field of a second direction of rotation 9 of the second group 7.

In accordance with a further preferred embodiment, the inverter 12 is designed such that the amplitudes and phases of the generated AC voltages 13A-B can be set in a variable manner. As a result, a general control method 1 can be realized, in which the coils 5 are actuated by voltage profiles, which are coordinated with one another in a targeted manner, such that the induced magnetic fields are superposed to form a desired overall field.

In accordance with a further preferred embodiment of the system composed of a three-phase AC motor and an inverter 12 according to aspects of the invention, the three-phase AC motor has an apparatus that can be used to lock the rotary movement of the rotor. Possible forms of this apparatus are, for example, a brake or a locking brake. As a result, it is advantageously possible to prevent the rotary movement in a mechanical manner, such that also in the case in which the control method does not balance the torques accurately, the electrical power is converted exclusively to heat, without additional movement being generated.

What is claimed is:

1. In a three-phase alternating current (AC) motor having a rotatably mounted rotor and a stator including a first group of coils and a second group of coils, wherein each of the coils generates an oscillating magnetic field upon actuation using an alternating current, a method for controlling a three-phase AC motor comprising:
   selecting the phases of the alternating currents such that the superposition of the magnetic fields of the first group of coils generates a magnetic rotating field that rotates with a direction of rotation and the superposition of the magnetic fields of the second group of coils generates a magnetic rotating field that rotates counter to the direction of rotation to generate from the alternating currents both: (i) kinetic energy for rotary movement of a vehicle, and (ii) heat without a separate heating mechanism of the vehicle; and
   feeding the generated heat to a heating/cooling system of the vehicle.

2. The method as claimed in claim 1, wherein the alternating currents for actuating the first group of coils have a constant first amplitude, the alternating currents for actuating the second group of coils have a constant second amplitude and a ratio of the first and second amplitude can be set to at least two different values.

3. A system comprising a three-phase AC motor and an inverter, wherein the three-phase AC motor has a rotatably mounted rotor and a stator comprising a first group of coils and a second group of coils, wherein each of the coils generates an oscillating magnetic field upon actuation using an alternating current generated by the inverter, wherein the phases of the alternating currents are configured such that the superposition of the magnetic fields of the first group of coils generates a magnetic rotating field that rotates with a direction of rotation and the superposition of the magnetic fields of the second group of coils generates a magnetic rotating field that rotates counter to the direction of rotation.

4. The system as claimed in claim 3, herein the coils are configured to be actuated in a targeted manner.

5. The system as claimed in claim 3, wherein the inverter generates the alternating currents from an applied DC voltage by pulse-width modulation.

6. The system as claimed in claim 3, wherein the three-phase AC motor comprises a brake or a locking brake that is configured to lock the rotary movement of the rotor to exclusively generate the heat without the separate heating mechanism of the vehicle.

* * * * *